United States Patent Office 3,188,256
Patented June 8, 1965

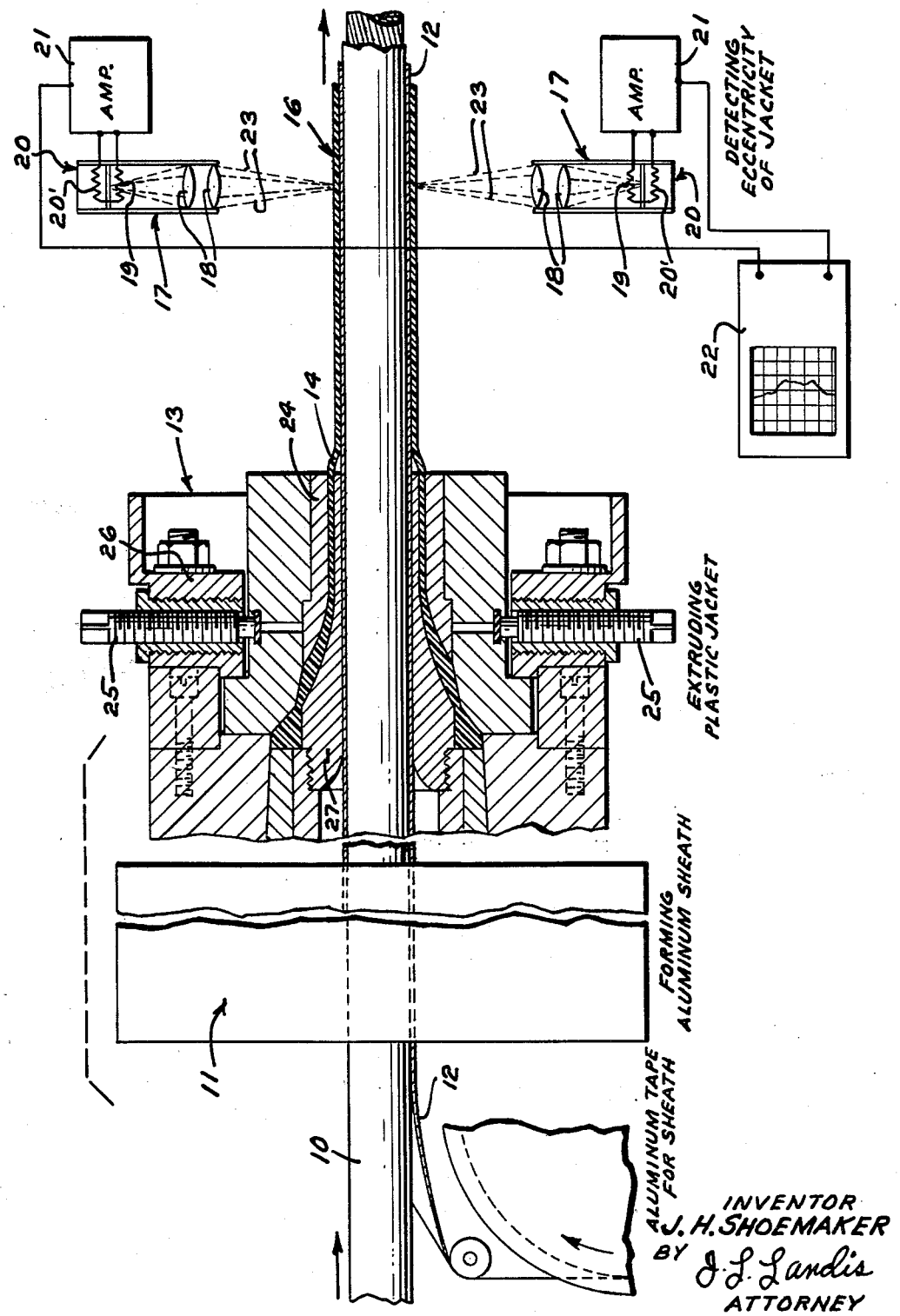

3,188,256
THERMAL RADIATION METHOD OF MEASURING COATING THICKNESS
John H. Shoemaker, Ralston, Nebr., assignor to Western Electric Company, Incorporated, New York, N.Y., a corporation of New York
Filed June 22, 1961, Ser. No. 118,993
5 Claims. (Cl. 156—244)

The present invention relates generally to methods of measuring the thickness of a hot coating on a heat-conducting substrate while the coating is in the transient state of cooling, and more particularly to the utilization of such methods to measure the eccentricity of a freshly extruded plastic jacket enveloping an aluminum-sheathed cable core. Accordingly, the general objects of the invention are to provide new and improved methods of such character.

In the manufacture of certain multiwire communications cable, a plastic jacket is extruded about an aluminum-sheathed cable core to hermetically seal and protect the cable core. In accomplishing this protective purpose, it is desirable that a minimum thickness of the plastic jacket be maintained around the entire core. Occasional shifting of the cable with respect to the die of an extruder and occasional differences in the temperature and pressure of the plastic, however, make this objective difficult to obtain since the resulting jacket tends to become eccentric.

In the past, eccentricity measurements, where made at all, have been made by various different types of detectors or by manual methods after completion of the sheathing operation which required that the cable be contacted. Therefore, such detectors had to be located after a long cooling trough which conventionally follows the extruder so as to allow the hot, freshly extruded plastic jacket to cool and thereby avoid damaging the cable due to the physical contact required. For this reason, a rather long time elapsed, after the plastic jacket was extruded, before the measurement could be made; consequently, the die and core tube of the extruder could not be promptly adjusted to compensate for departures from a concentric condition. To enable such an adjustment to be made promptly, it is required that the measurement be made substantially immediately after the extruded cable emerges from the die of the extruder.

Therefore, a more specific object of the invention is to provide new and improved methods of measuring the eccentricity of a hot, freshly extruded plastic jacket on a moving aluminum-sheathed cable core, which methods do not require contact with the jacket and which can thus be utilized substantially immediately after the jacket has been extruded on the cable so that prompt compensation may be made for departures from the desired concentricity.

A further object of the invention is to provide new and improved methods of measuring the thickness and eccentricity of a hot, freshly extruded plastic jacket on a moving aluminum-sheathed cable core, which utilize advantageously the inherent properties of the freshly extruded cable in the measurement.

With the foregoing and other objects in mind, and in accordance with certain aspects of the invention, the intensity of thermal radiation emitted from a known area of hot coating on a heat-conducting substrate is measured when it has cooled from a selected temperature for a predetermined period of time to obtain an indication of the thickness of the coating. The substrate acts as a limited-capacity heat sink by conducting heat away from the hot coating such that thermal radiation emitted has a measurable intensity which, based on the given area, is an increasing function of the thickness of the hot coating.

According to certain more specific aspects of the invention, an indication of the eccentricity of a hot, freshly extruded plastic jacket enveloping an aluminum-sheathed cable core is obtained by measuring the intensity of thermal radiation emitted from equal areas of the freshly extruded jacket on opposite sides of the cable substantially immediately after the cable emerges from the extruder die. The aluminum sheath acts as a limited capacity heat sink, as previously described, by conducting heat away from the interior of the hot plastic jacket. The measured intensities of the thermal radiation emitted from the jacket on opposite sides of the cable are correlated comparatively as a measure of the eccentricity of the jacket.

Other objects, advantages, and aspects of the invention will appear from the following detailed description of a specific embodiment thereof, when taken in conjunction with the appended drawing, in which the single figure is an elevational view, partly in section, of an eccentricity detector for a jacket enveloping an aluminum-sheathed cable core, and of typical sheathing and jacketing apparatus.

Referring now in detail to the drawing, there is illustrated one specific embodiment of the invention in which a cable core 10, being paid out from a supply reel (not shown), is advanced through a sheathing apparatus 11, where an aluminum sheath 12 is formed longitudinally about the core 10; through an extruder 13, where a polyethylene jacket 14 is extruded about the aluminum sheath 12; through a water bath (not shown), where the hot, freshly extruded jacket 14 cools; and then to a take-up reel (not shown), where the cable, designated generally by the numeral 16 is rewound.

As the plastic jacket 14 is extruded about the aluminum-sheathed cable core, the sheath 12 acts as a limited-capacity heat sink by conducting heat away from the interior of the plastic jacket 14. Such conduction of heat provides for a correlation between thermal radiation and the thickness of the coating. More specifically, conduction of heat away from the coating by such a substrate causes the temperature of the coating to decrease as an inverse function of the thickness of the coating, consequently the thermal radiation emitted by such coating, normally independent of coating thickness, becomes a function of the thickness thereof since the temperature is made to vary with thickness. Therefore, the effect of this heat conduction is such that the thermal radiation (heat and/or infrared rays) emitted by the jacket after it leaves the extruder 13 has a measurable intensity which is an increasing function of the jacket thickness at a given extrusion temperature and distance from the extruder. This inherent property of the extruded cable 16 is utilized advantageously in measuring the thickness and especially the eccentricity of the plastic jacket 14.

In order to measure eccentricity, a pair of thermal radiation detectors 17—17 are positioned a short distance beyond the extruder 13 along the path of advancement of the extruded cable 16, one on either side of the advancing cable 16. While various detectors may be utilized, in a preferred embodiment of the invention each detector 17 includes a system of convex lenses 18—18 designed to concentrate thermal radiation emitted from a very small spot on the jacket and to focus the same on an active element 19 of a thermistor bolometer 20 having an electrical resistance which varies with its temperature. A second element 20' of the thermistor bolometer 20, shielded from the thermal radiation, compensates for ambient temperature so that the output of the bolometer 20 is indicative of the difference between jacket and ambient temperatures. Each bolometer 20 is connected in series with a power source (not shown) and an amplifier 21 to furnish one input to a differential comparator 22. Since thermal radiation 23—23 emitted at any given time from equal areas of the plastic jacket 14 adjacent to the detectors 17—17 on opposite sides of the cable 16 is a function of the jacket thickness, the thickness on each side is indicated by the output from the associated detector 17, and the difference between the outputs of the two detectors 17—17 is correlated by the differential comparator 22 as a measure of the eccentricity of the plastic jacket 14.

Since the detectors 17—17 do not contact the cable 16, they may be located a short distance beyond the extruder die 24, in front of the conventional water bath, so as to measure the thickness and/or eccentricity immediately. In practice, the relative position of the aluminum-sheathed cable core with respect to the die 24 is adjusted both vertically and horizontally, either manually or through servomechanisms, in order to compensate for such departures from a concentric condition as are of significance. One simple way of accomplishing this adjustment is illustrated in the drawing, where two pairs of opposing set screws 25—25 are mounted (one pair of which is shown) in an extruder housing 26 at intervals of 90 degrees around the die 24, such that they abut the extruder die 24 in adjustable relationship to a core tube 27 through which the core 12 passes. In response to indicated departures from a concentric condition, the set screws 25—25 are adjusted to alter the position of the die 24 both vertically and horizontally, as required, to restore the desired concentric condition.

The comparator 22 may be of any conventional design which is known to compare the input signals of unequal strengths, such as a balanced bridge circuit including a null indicating device. The comparator 22 may either record the eccentricity continuously, as illustrated, or may serve to provide an error signal which, through conventional servomechanisms, operates automatically to correct an eccentric condition and rebalance the bridge. Such details of comparison of the signals, recording and/or control, are well known and may easily be selected to suit any given application of the invention, the crucial feature being the provision of some type of heat and/or infra-red detector which is sufficiently sensitive to provide an output signal which varies by discriminable amounts with such changes in thickness as are required to be detected.

While the subject method is utilized primarily to measure the eccentricity of a cable jacket, it is obvious that it may equally well be utilized to measure thickness only whether of a cylindrical jacket or of a flat substrate having a hot coating layer, where the detector output is utilized on an absolute basis rather than on a comparative basis. For certain applications, the thickness would be measured simultaneously at a plurality of points, preferably around a single circumference of a jacketed cable core to provide a continuous composite indication of jacket thickness all around the core.

While one specific embodiment of the invention has been described in detail hereinabove, it will be obvious that various modifications may be made from the specific details described without departing from the spirit and scope of the invention.

What is claimed is:

1. The method of measuring the thickness of a hot coating on a heat conducting substrate, which comprises the steps of allowing the hot coating to cool from a selected temperature for a predetermined period of time, whereby the substrate acts as a limited capacity heat sink by conducting heat away from the coating so that the temperature of the coating decreases as an inverse function of the thickness thereof; measuring the intensity of thermal radiation emitted from a known area of the hot coating; and correlating such thermal radiation measurement with coating thickness.

2. The method of measuring the thickness of a hot jacket enveloping a core having at least an outer surface of heat-conducting material while the jacketed core is moving, which method comprises the step of measuring the intensities of thermal radiation emitted from a plurality of equal small areas of the hot jacket around a single circumference simultaneously to provide a composite indication of the thickness of the jacket all around the core, the heat-conducting material acting as a limited-capacity heat sink by conducting heat away from the jacket such that the thermal radiation emitted at any time has a measurable intensity which, based on the given areas, is an increasing function of the thickness of the jacket.

3. The method of measuring the eccentricity of a hot jacket enveloping a core having at least an outer surface of heat-conducting material, which method comprises the steps of measuring the intensity of thermal radiation emitted from equal areas of the hot jacket on opposite sides of the core to provide a measure of the thickness of the jacket on opposite sides of the core, the heat-conducting material acting as a limited-capacity heat sink by conducting heat away from the interior of the hot jacket such that the thermal radiation emitted has a measurable intensity which, based on the given areas, is an increasing function of the thickness of the jacket; and comparing the measured intensities on opposite sides of the jacket to obtain an indication of the eccentricity.

4. The method of measuring the eccentricity of a hot, freshly extruded plastic jacket enveloping an aluminum-sheathed cable core as the cable emerges from an extruder die, which method comprises the steps of measuring the intensity of thermal radiation emitted from equal areas of the freshly extruded jacket on opposite sides of the cable substantially immediately after the cable emerges from the extruder die, the aluminum sheath acting as a limited-capacity heat sink by conducting heat away from the interior of the jacket such that the thermal radiation emitted has a measurable intensity which, based on the given areas, is an increasing function of the jacket thickness at a given extrusion temperature; and correlating comparatively the measured intensities of the thermal radiation emitted from the jacket on opposite sides of the cable as a measure of the eccentricity of the jacket.

5. In combination with a cable-making process of the type wherein an aluminum sheath is first formed about a moving cable core and the aluminum-sheathed core is subsequently advanced through an extruder die where a hot plastic jacket is extruded about the aluminum sheath; the method of measuring the eccentricity of the extruded jacket shortly after the cable emerges from the extruder die and without contacting the jacket which is still hot and soft, which method comprises the steps of measuring the intensity of the instantaneous thermal radiation emitted from equal areas of the freshly extruded plastic jacket on opposite sides of the cable a short distance beyond the extruder die, the aluminum sheath acting as a limited-capacity heat sink by conducting heat away from the interior of the jacket such that the terminal radiation emitted has a measurable intensity which, based on the given areas, is an increasing function of the jacket thickness at a given extrusion temperature; correlating comparatively the measured intensities of the thermal radiation emitted from the jacket on opposite sides of the cable as a measure of the eccentricity of the jacket; and adjusting the relative position of the cable core with respect to the extruder die in order to compensate for such indicated departures from a concentric condition as are of significance.

References Cited by the Examiner

UNITED STATES PATENTS

| | | | |
|---|---|---|---|
| 1,789,098 | 1/31 | De Graaf | 73—355 |
| 3,017,512 | 1/62 | Wolbert | 250—83.3 |
| 3,027,457 | 3/62 | Mouly | 250—83.3 |

EARL M. BERGERT, *Primary Examiner.*

CARL F. KRAFFT, *Examiner.*